United States Patent

[11] 3,545,788

| [72] | Inventors | Frederick A. Brawner<br>Detroit;<br>William L. Pringle, Grosse Pointe, Michigan |
|---|---|---|
| [21] | Appl. No. | 682,428 |
| [22] | Filed | Nov. 13, 1967 |
| [45] | Patented | Dec. 8, 1970 |
| [73] | Assignee | Jim Robbins Seat Belt Co.<br>Troy, Michigan |

[54] OVERHEAD MOUNTED BELT RETRACTOR WITH LATCH MEANS
5 Claims, 7 Drawing Figs.

[52] U.S. Cl..................................................... 280/150, 297/388
[51] Int. Cl...................................................... B60r 21/10
[50] Field of Search............................................ -
280/150(SB); 296/84(K), 97(.58); 297/388, 389

[56] References Cited
UNITED STATES PATENTS

| 3,184,267 | 5/1965 | Rumble....................... | 297/388 |
| 3,418,007 | 12/1968 | Jantzen......................... | 280/150 |
| 3,130,807 | 4/1964 | McHenry..................... | 280/150 |
| 3,400,977 | 9/1968 | Jones............................ | 280/150 |
| 3,439,933 | 4/1969 | Jantzen......................... | 280/150 |

Primary Examiner—Banjamin Hersh
Assistant Examiner—Robert R. Song
Attorney—Hauke, Krass and Gifford ABSTRACT: An overhead retractor for a vehicle shoulder belt having a spring-loaded latch preventing the belt's retraction when it is fully extended from the retractor. A manually operated button permits the operator to deliberately release the belt for retraction when it is not employed as a body restraining element.

PATENTED DEC 8 1970

INVENTORS
FREDERICK A. BRAWNER
WILLIAM L. PRINGLE

BY Hauke, Krass, & Gifford
ATTORNEYS

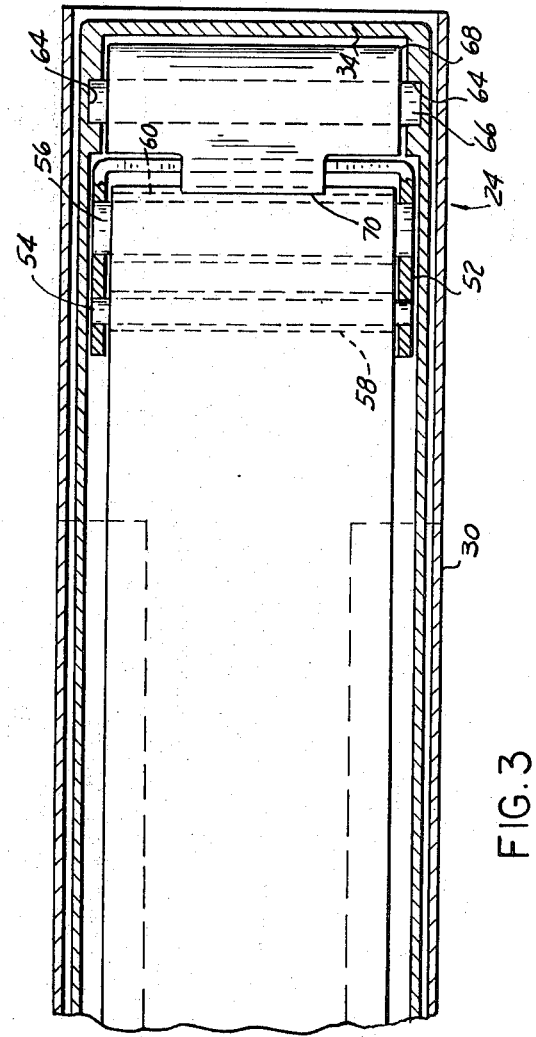

3,545,788

SHEET 3 OF 3

OVERHEAD MOUNTED BELT RETRACTOR WITH LATCH MEANS

BACKGROUND OF THE INVENTION

1. Field Of The Invention

This invention relates to improvements in vehicle safety seat belt retracting apparatus and more particularly to an overhead mounted, linear retractor having bias means for urging a shoulder belt toward a stored position within the retractor and manually releasable latch means actuated by the belt being fully extended from the retractor to prevent the belt's return toward its stored position.

2. Description of the Prior Art

Shoulder belts are widely employed in combination with lap belt assemblies for restraining the sudden displacement and jackknifing of a vehicle occupant in the event of a sudden vehicular deceleration. For both appearance and safety reasons the shoulder belt is normally retracted toward a stored position by a retracting device when the belt is not employed as a restraining element.

Belt retracting devices may be characterized as being of the "locking" or "nonlocking" type. Locking retractors permit the belt to be partially extended a selected length from the retractor and then employ means for locking the retractor against further extension or for clamping the belt directly to the vehicle. In either case, a fixed connection is established between the partially extended belt and the vehicle in an emergency situation.

In "nonlocking" retractors, the belt is extended substantially its full length from the retractor. The inner end of the belt is anchored to the vehicle so that a separate locking or clamping means is not necessary. The present invention is concerned with "nonlocking" retractors.

The requirements for seat belt retractors established by Federal Standards provide that instructions for a nonlocking retractor shall include a caution that the belt must be fully extended from the retractor during use of the seat belt assembly unless the retractor is attached to the free end of the belt which is not subjected to any tension during restraint of an occupant by the assembly. The broad purpose of the present invention is to provide a nonlocking retractor for a shoulder belt which indicates to the occupant when the shoulder belt has been fully extended so that it can not be inadvertently joined to a lap belt in such a manner as to allow further extension of the belt on sudden deceleration.

SUMMARY

The preferred embodiment of the present invention takes the form of a shoulder belt retractor having spring bias means urging the belt toward a retracted position. When the belt is partially extended, the user can feel the tension on the belt caused by the spring bias means. When the belt is fully extended, a latch on the retractor renders the spring bias means ineffective. Thus the user can determine from the absence of a pull on the belt that it is fully extended.

The preferred retractor comprises an elongated channel having an open end for receiving and issuing the belt. The channel is mounted to an overhead portion of the vehicle, however, it could be mounted in the back supporting structure of the seat assembly where a suitable overhead structure is not available such as in convertibles and the like. An anchor pin and a pair of channel-mounted rollers are mounted adjacent the belt-receiving mouth of the channel.

A carriage slidably mounted in the channel for motion toward and away from the anchor pin carries a second pair of rollers. The belt is attached to the anchor pin and then is wrapped around the channel-mounted and carriage-mounted rollers to form a series of short, parallel, linear sections. The free end of the belt extends through the belt-receiving opening. Spring bias means urge the carriage away from the anchor pin so that in the absence of a pullout force, the stored linear belt sections elongate and retract the extended portion of the belt into the channel. The application of a nominal pullout force on the free end of the belt draws the carriage toward the anchor pin so that the length of the linear sections is reduced as the belt is extended.

Preferably, the spring means biasing the carriage toward the fully stored belt position comprises a spirally coiled spring journaled on a pin mounted on the channel with the free end of the spring attached to the carriage. An alternative form of spring bias means comprises a spirally wound coil spring journaled on a carriage-mounted pin with the free end of the spring attached to the channel.

A spring loaded latch is mounted on the channel near the anchor pin and extends toward an interference position with respect to the travel of the carriage. The carriage engages a cammed portion of the latch as it travels toward the anchor pin to unwind the belt. The cammed portion is contoured so that the carriage forces the latch away from its interference position until the carriage has cleared the latch. The latch then snaps behind the carriage so that it is captured by the latch and cannot return towards its retracted position under the influence of the spring-bias means.

The user can readily ascertain whether the belt has been fully extended. If upon releasing the extended end of the belt a retracting force tends to retract the belt toward its stored position, he knows that the belt has not been fully extended. If, however, upon releasing the belt it does not return toward its retracted position, he knows that the belt has been fully extended. In addition, the latch normally snaps into its locking position behind the carriage with an audible sound so that the user can hear the latch engaging the carriage.

It is therefore an object of the present invention to provide a "nonlocking" safety seat belt retracting device having means for indicating to the occupant that the belt has been fully extended from its stored position.

It is another object of the present invention to provide an overhead mounted "nonlocking" retractor for a safety seat belt having spring-bias means for withdrawing the belt toward a stored position with releasable latch means preventing the belt's retraction after it has been extended to essentially its full operating length.

Still another object of the present invention is to provide an overhead mounted retracting device for the shoulder belt portion of the vehicle safety seat belt intended to be extended essentially its full length when employed as a body-restraining element, with means providing an audible indication that the belt has been fully extended from its stored position within the retractor.

Still further objects and advantages of the present invention will readily occur to one skilled in the art to which the invention pertains upon reference to the following detailed description.

DESCRIPTION OF THE DRAWINGS

The description refers to the accompanying drawings in which like reference characters refer to like parts throughout the several views and in which:

FIG. 2 is an enlarged, longitudinal sectional view of the retracting device of FIG. 1;

FIG. 3 is a view taken substantially along lines 3-3 of FIG. 2 with parts of the preferred retractor shown in section for purposes of description;

DESCRIPTION OF THE PREFERRED EMBODIMENT

Figure 1:
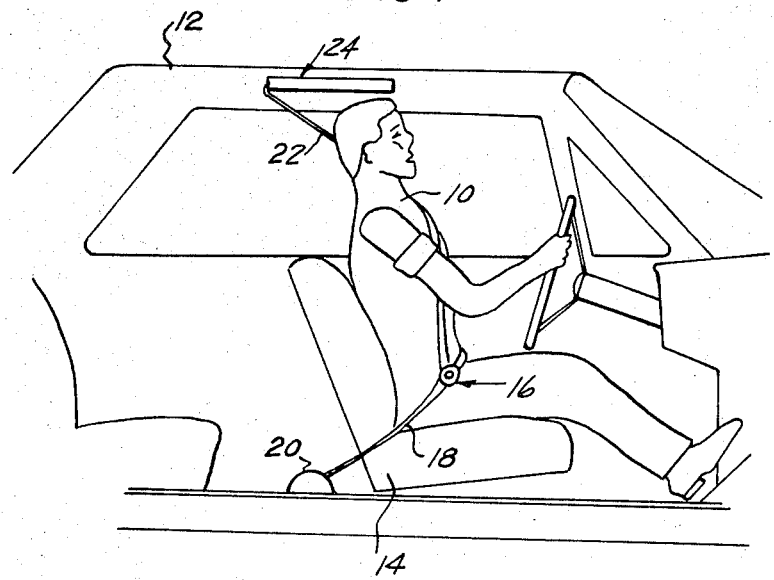
FIG. 1 is a fragmentary view of a vehicle with an occupant restrained by a shoulder belt extending from an overhead retracting device constituting the preferred embodiment of the present invention.

Now referring to the drawings, FIG. 1 illustrates a user or occupant 10 within a vehicle 12 and seated on a seat structure 14. A safety seat belt assembly generally indicated at 16 and comprising a lap belt 18 having its lower ends anchored as at 20 to the floor of the vehicle and a shoulder belt 22 coupled to the lap belt provides means for restraining the occupant 10 against a sudden relative displacement in the event of a sudden deceleration of the vehicle 12.

The upper end of the shoulder belt 22 extends from a retracting device 24 mounted to an overhead part of the vehicle 12 and constituting the preferred embodiment of the invention.

The retractor 24 is of the linear type, that is to say it stores the belt 24 into a series of linear and parallel sections when the belt 22 is not employed as a restraining element. Referring to FIGS. 2 and 3, the retractor 24 comprises an elongated housing 26 fixedly attached to the overhead portion of the vehicle 12 by fastening means 28 and 30. The housing 26 is preferably formed of sheet metal and is open at its opposite ends.

An elongated channel 30 is mounted within the housing 26 and has a belt-receiving opening 32 facing the seated position of the occupant 10 and a closed end 34 opposite the belt-receiving opening 32.

Three pair of vertical slots 36, 38 and 40 are formed in the sidewalls of the channel 30 adjacent the belt-receiving opening 32.

A pin 42 is mounted in the first pair of slots 36 adjacent the belt-receiving opening 32 and carries a channel mounted roller 44. The roller 44 comprises a sleeve formed of a low friction plastic material and functions to guide the belt 22 as it is withdrawn into or issues from its stored position within the channel 30.

A pin 46 is mounted in the second pair of slots 38 and supports a second channel-mounted roller 48. The roller 48 is formed from a sleeve of a relatively low friction plastic material. The roller 48 rotates about the pin 46 and provides means for forming a return bend in the belt 22.

An anchor pin 50 mounted in the third pair of slots 40 and inwardly spaced from the rollers 44 and 48 provides means for attaching the terminal end of the belt 22.

A substantially U-shaped carriage member 52 is slidably mounted in the channel 30 for movement toward and away from the anchor pin 50. A pair of spaced pins 54 and 56 are mounted in the arms of the carriage 52. A small roller 58 is rotatably carried by the pin 54 and a large roller 60 is carried by the pin 56. The rollers 58 and 60 are preferably formed of a low-friction, plastic material with the larger diameter roller 60 being mounted on the carriage 52 in the direction away from the anchor pin 50 relative to the roller 58.

As can best be seen in FIG. 2, the inner end of the belt 22 is stitched into a loop 62 which receives the anchor pin 50. The belt extends from the anchor pin 50 towards the carriage and is successively wrapped around the mounted roller 58, the channel-mounted roller 48, the carriage-mounted roller 60 and then toward the belt-receiving opening 32. Thus, it can be seen that the belt 22 is formed within the channel into a series of parallel linear sections.

As best seen in FIG. 3, a pair of notches 64 formed in the sidewalls of the channel 30 adjacent the closed end 34 provide means for seating a pin 66. A spirally wound coil spring 68 is journalled on the pin 66 with its outer free end 70 engaging a short lip portion 72 of the carriage 52. Movement of the carriage 52 toward the anchor pin 50 unwinds the spring 68 so that it provides a bias on the carriage urging it away from the anchor pin 50. The bias of the spring 68 is chosen so that it yields to the application of a nominal pullout force in the belt.

A buckle tongue 73 carried by the free end of the belt provides a handle for the occupant to apply a pullout force on the belt 22.

A latch member 74 is pivotably mounted to a pair of downwardly depending lugs 75 carried by the channel 30 adjacent the anchor pin 50. The latch has a nose portion 76 which extends through an opening 78 in the base of the channel 30. The latch 74 is mounted by a pin 80 which also provides means for supporting a spring 82. Spring 82 biases the latch 74 so that the nose portion 76 is normally disposed in an interference path with respect to the travel of the carriage 52 as it moves within the channel 30.

Figure 6:
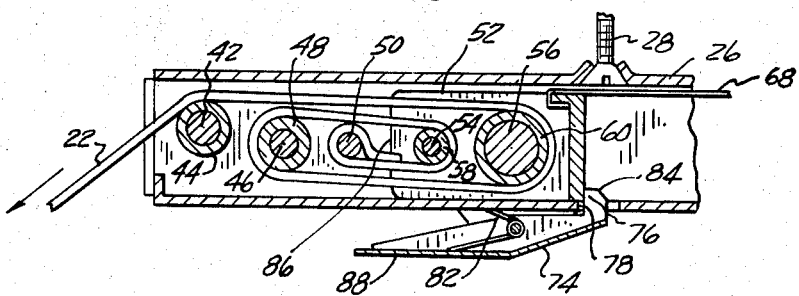
FIG. 6 is a fragmentary view showing the retraction of FIG. 2 in the fully extended condition.

As best seen in FIGS. 2 and 6, the carriage 52 engages a cammed portion 84 of the latch as it closely approaches the anchor pin 50. The carriage forces the nose 76 of the latch downwardly so that the carriage can continue its travel toward the pin 50. When the carriage 52 has cleared the nose 76, it snaps upwardly behind the carriage under the influence of the spring 82 and provides an audible sound. The position at which the latch 74 snaps behind the carriage 52 substantially corresponds to that at which the arms of the carriage moves into abutment with a pair of shoulders 86 formed in the sidewalls of the channel 30 to terminate the travel of the carriage toward the pin 50. This position of the carriage corresponds to the fully extended condition of the shoulder belt 22.

When the carriage has completed its travel toward the pin 40, the anchor pin, the carriage 52 and the pins 42, 46, 54 and 56 cooperate to transfer restraining forces applied by the belt on occupant 10 to the vehicle. It can be seen that after fully extending the belt 22 to the position illustrated in FIG. 6, where the carriage is trapped by the latch 74, the occupant 10 can readily determine that the belt is fully extended because it will not return toward its stored position when the extended end of the belt is released.

A button portion 88 formed on the latch 74 and accessible to the occupant 10 provides means for applying a manual release force on the latch so that the carriage can retract the belt 22 toward its stored position when the belt 22 is not in use.

Figure 7:
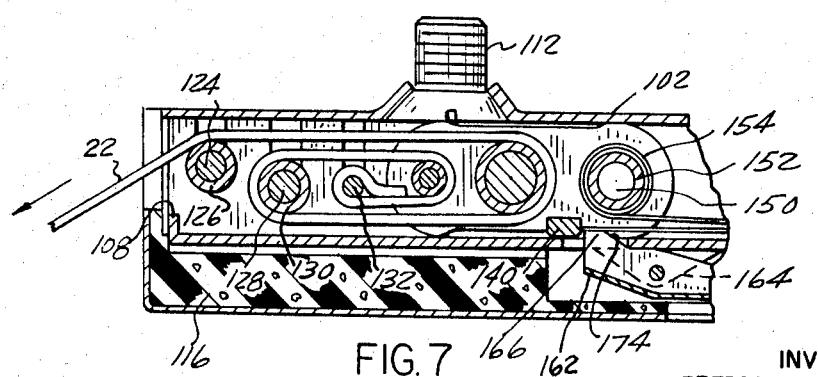
FIG. 7 is a fragmentary view showing the retraction of FIG. 4 in the fully extended condition.
Figure 5:
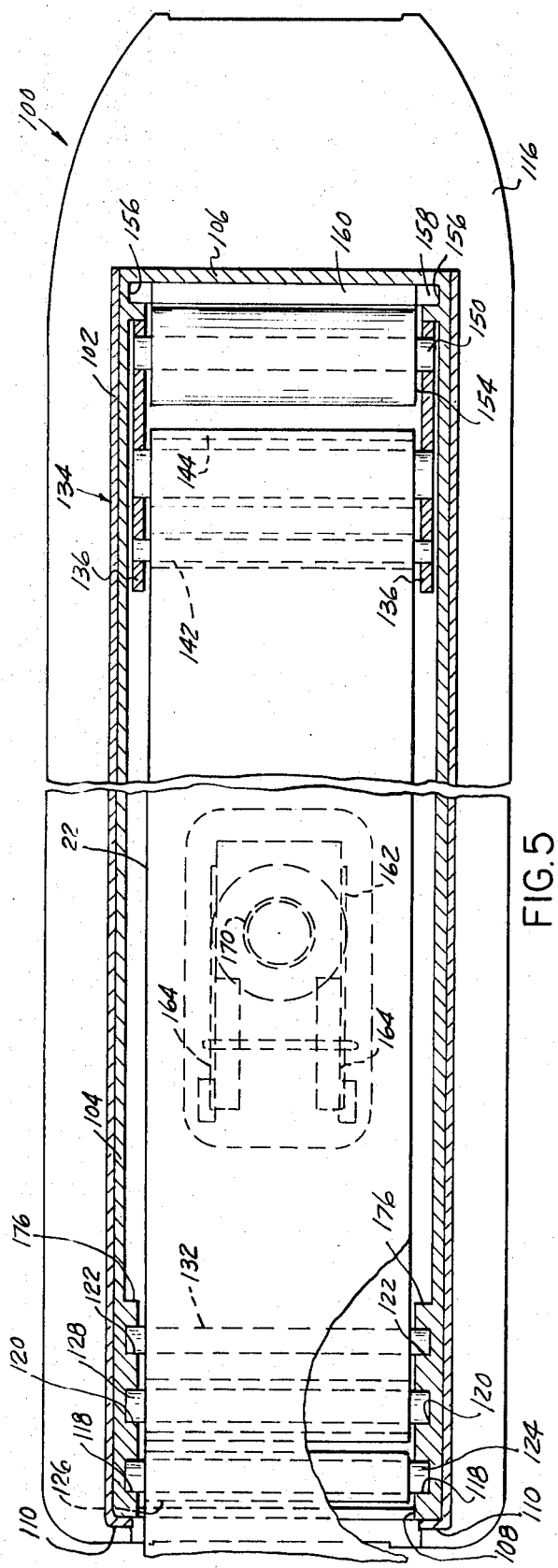
FIG. 5 is a view as seen substantially along lines 5-5 of FIG. 4.
Figure 4:
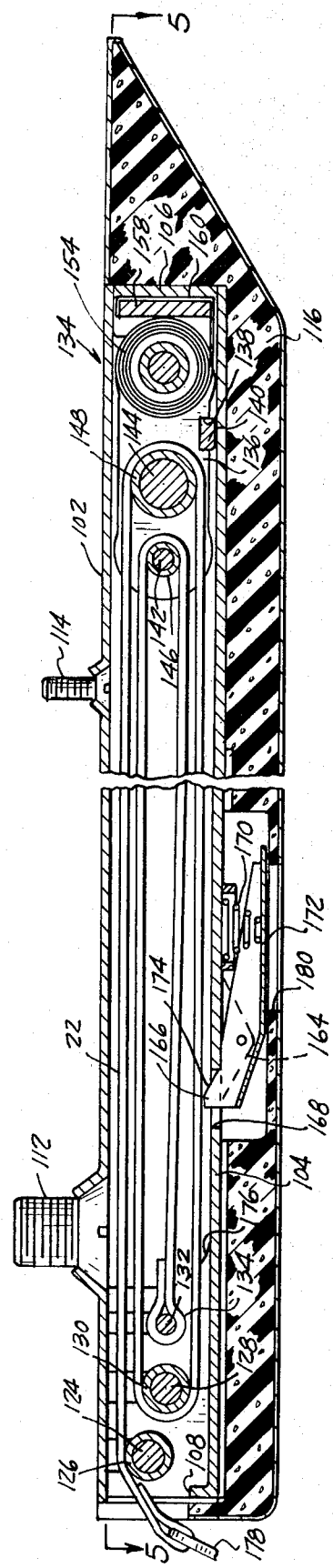
FIG. 4 is a longitudinal sectional view through a second embodiment of the invention.

FIGS. 4, 5 and 7 illustrate a second embodiment of the invention in the form of an overhead, linear retractor 100 which is coupled to the upper end of the shoulder belt 22 to withdraw the belt 22 into a stored position when it is not in use where it is wrapped into a series of linear, parallel sections.

The retractor 100 comprises an elongated channel-shaped housing 102 open at its opposite ends. A channel 104 is mounted in the housing 102 and has a closed end 106 and an open belt-receiving end 108 opposite the closed end 106. A pair of inwardly directed flanges 110 of the housing 102 engage the channel 104 adjacent its open end and cooperate in retaining the channel 104 within the housing when the belt is applying a restraining force.

Threaded fasteners 112 and 114 are adapted to fixedly mount the housing 102 to an overhead portion of the vehicle in a manner similar to that described with reference to the embodiment illustrated in FIGS. 2 and 3.

The housing 102 and the channel 104 provide an elongated, substantially closed storage area for receiving the belt 22 when it is withdrawn from an extended condition.

A sponge rubber cover 116 substantially encloses the housing 102 and provides a cushion for protecting the occupant 10 in the event of an accident of the like where unrestrained occupants in the vehicle may be violently displaced from their normal positions.

Three pair of slots 118, 120 and 122 are formed in the sidewalls of the channel 104 adjacent the belt-receiving opening 108. A pin 124 having its opposite ends seated in the slots 118 immediately adjacent the belt-receiving opening 108 supports a roller 126 which is preferably formed of a low-friction plastic. The roller 126 assists in guiding the belt 122 as it is withdrawn into or extended from its stored area within the channel 104.

A pin 128, having its opposite ends seated in the second pair of slots 120, supports a guide roller 130 which is also preferably formed of a suitable low-friction plastic. The roller 130 functions to form the belt into a return bend as can best be seen in FIG. 4.

A third pin 132 is mounted in the third pair of slots and functions as anchoring means for the looped terminal end 134 of the belt 122.

Carriage means, generally indicated at 134, are slidably mounted on the base of the channel 104 for motion toward and away from the anchor pin 132. The carriage means 134 preferably comprise a pair of side plates 136 each of which has a notch 138 formed along its lower edge. A latch bar 140 is seated in the notches 138 and is slidably engaged with the base of the channel 104.

The side plates 136 are apertured to support a relatively small pin 142 and a relatively large pin 144. A roller 146 is journalled on the pin 142 and a roller 148 is journalled on the pin 144, the roller 148 having a diameter larger than the roller 146 so that the belt can be wrapped in a return bend around that portion of the belt that is wrapped around the roller 146. The rollers 146 and 148 are preferably formed of a suitable, lightweight, low-friction plastic material.

It can be seen by reference to FIG. 4 that the belt extends from the anchor pin 132 toward the carriage means 134 and is successively wrapped around the roller 146, the roller 130, the roller 148, and then is guided by the roller 126 as it issues through the belt-receiving opening 108. It can also be seen that the belt 22 is stored in a series of parallel linear sections with the length of the sections being determined by the relative position of the carriage means 134 and with respect to the anchor pin 132. As the carriage means 134 is moved away from the anchor pin, the linear sections increase in length so that they withdraw the belt into its stored position. Similarly, as the carriage means 134 is moved toward the anchor pin, the linear sections of the belt 22 are reduced so that the belt can be extended within the retractor for coupling to the lap belt 18 of the seat belt assembly.

A spring-supporting pin 150 is also journalled in the side plates 136 of the carriage means 134 and supports a sleeve 152 which functions as a journal for a spirally wound coil retractor spring 154.

A pair of notches 156 formed in the sidewalls of the channel 104 adjacent the closed end 106 provide a socket for an anchor member 158. The anchor member 158 provides means for restraining the free outer end 160 of the spring 154. Thus, as the carriage moves toward the belt-receiving opening under the influence of a pullout force on the belt 22, the body of the spring is carried with the carriage and unwinds. The unwound spring provides a retracting force tending to restore the carriage towards its position adjacent the closed end 106 of the channel which corresponds to the fully stored condition of the belt 22. Upon release of the pullout force acting on the extended end of the belt, the spring 154 tends to assume its wound-up condition and urges the carriage means 134 towards its fully retracted position.

It will be noted that the retracting spring arrangement illustrated in FIG. 4 differs from the retracting spring arrangement of the embodiment illustrated in FIG. 2 in that in the embodiment of FIG. 4 of the body of the spring is carried by the carriage with its outer end anchored to the channel whereas in the embodiment of FIG. 2 the body of the spring is anchored to the channel with its outer end attached to the carriage.

A latch member 162 is pivotally mounted to a pair of lugs 164 which depend downwardly from the channel and adjacent the anchor pin 132. The latch 162 has a nose portion 166 which extends through an aperture 168 in the channel so that it can assume an interference position with respect to the path of the latch bar 140 of the carriage.

A spring 170 acting between a button portion 172 and the underside of the channel base normally biases the latch 162 so that the nose is disposed in its interference position.

The latch 162 has a cammed portion 174 facing in a direction opposite the anchor pin 132 so that as the carriage 134 approaches the latch in a direction toward the anchor pin, the latch bar 140 engages the cammed portion and forces the latch downwardly allowing the carriage to continue its movement toward the anchor pin 132 as the belt is withdrawn towards its fully extended condition.

As can be seen in FIG. 7, when the latch bar clears the nose 166, the latch 162 snaps upwardly under the influence of the spring 170 to provide an audible indication to the occupant that the belt 22 is in its fully extended position.

Referring to FIGS. 5 and 7, as the latch bar 140 clears the nose 166 of the latch with the belt fully extended, the forward edges of the side plates 136 abut a pair of shoulders 176 which terminate the travel of the carriage.

In this fully extended position and with the carriage in a captured position by the latch 162, the occupant can readily ascertain that the belt is fully extended, not only by the sound of the latch snapping behind the carriage, but because of the absence of a retracting force on the belt 22.

To extend the belt, the occupant grasps the tongue 178 attached to the free end of the belt and pulls the belt down into a position for coupling to the complementary buckle section carried by the lap belt 18. FIG. 7 illustrates the position of the retractor components when the belt is fully extended. When the occupant wishes to restore the belt to its stored position, he applies a manual release force on the button 172 through an opening 180 in the cover 116 so that the carriage 134 under the influence of the retractor spring 154 is moved away from the anchor pin 134 and withdraws the belt 22 into its stored position.

It is to be understood that we have described the preferred embodiments of our invention and that various revisions and modifications can be made therein without departing from the spirit of the invention.

We claim:

1. A safety seat assembly for mounting in a vehicle comprising: an elongated housing having first and second ends and adapted for attachment to a vehicle and defining a guideway therealong, said housing having a belt-receiving opening from the exterior thereof into said guideway adjacent said first end thereof; a seat belt extending through said belt-receiving opening and into said guideway; retractor means disposed in said guideway for movement therealong for retracting and extending said belt through said belt-receiving opening; said housing having a latch opening adjacent said first end thereof; an integral latch member pivotally connected to said housing, said latch member including a nose portion extending through said latch opening for normal disposition in an interference path with respect to the path of travel of said retractor means for coacting with said retractor means to retain said retractor means adjacent said first end of said housing to prevent said belt from being retracted into said housing, said latch member further including a button portion disposed exteriorly of said housing for applying a manual release force on said latch member to remove said nose portion from said latch opening to allow said retractor means to move toward said second end of said housing to retract said belt.

2. An assembly as set forth in claim 1 wherein said nose portion is disposed on the opposite side of the axis of the pivotal connection of said latch member to said housing from said button portion.

3. An assembly as set forth in claim 2 including spring means urging said latch member to pivot in the direction for moving said nose portion through said latch opening.

4. An assembly as set forth in claim 3 including a pair of lugs extending from said housing, a pin extending between said lugs and pivotally supporting said latch member.

5. An assembly as set forth in claim 3 wherein said button portion is generally planar and transverse the direction in which said nose portion extends into said latch opening.